(12) United States Patent
Tang et al.

(10) Patent No.: US 11,038,632 B2
(45) Date of Patent: Jun. 15, 2021

(54) METHOD, TERMINAL DEVICE, AND NETWORK DEVICE FOR TIME-FREQUENCY RESOURCE BUNDLING IN TRANSMITTING DATA ON MULTIPLE CARRIERS

(71) Applicant: HUAWEI TECHNOLOGIES CO., LTD., Guangdong (CN)

(72) Inventors: Hao Tang, Shanghai (CN); Zhongfeng Li, Munich (DE); Zhenfei Tang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/453,957

(22) Filed: Jun. 26, 2019

(65) Prior Publication Data

US 2019/0319752 A1  Oct. 17, 2019

Related U.S. Application Data

(63) Continuation of application No. PCT/CN2017/118191, filed on Dec. 25, 2017.

(30) Foreign Application Priority Data

Dec. 29, 2016 (CN) .......................... 201611242404.7

(51) Int. Cl.
*H04L 1/18* (2006.01)
*H04W 72/04* (2009.01)

(52) U.S. Cl.
CPC .......... *H04L 1/1845* (2013.01); *H04L 1/1854* (2013.01); *H04W 72/042* (2013.01); *H04W 72/044* (2013.01)

(58) Field of Classification Search
CPC ... H04L 1/1845; H04L 1/1854; H04L 1/1822; H04L 1/08; H04L 1/1893; H04L 1/1819;
(Continued)

(56) References Cited

U.S. PATENT DOCUMENTS

2010/0232373 A1    9/2010  Nory et al.
2011/0194630 A1*   8/2011  Yang ..................... H04L 5/0055
                                                           375/260
(Continued)

FOREIGN PATENT DOCUMENTS

CN    101567763 A    10/2009
CN    101801094 A     8/2010
(Continued)

OTHER PUBLICATIONS

Huawei, HiSilicon, On multiple carrier operation, 3GPP TSG RAN WG1 #87 R1-1611200, Nov. 18, 2016,total 5 pages.

*Primary Examiner* — Tejis Daya
(74) *Attorney, Agent, or Firm* — Womble Bond Dickinson (US) LLP

(57) ABSTRACT

A method for transmitting data on multiple carriers, a terminal device, and a network device is disclosed. The method includes: receiving, by a terminal device, instruction information sent by a network device, where the instruction information is used to instruct the terminal device to perform cross-carrier time-frequency resource bundling; bundling, by the terminal device, time-frequency resources on a first type of carrier and a second type of carrier according to the instruction information; and sending or receiving, by the terminal device, data on the bundled time-frequency resources. The method for transmitting data on multiple carriers in the embodiments of the disclosure implements inter-carrier soft combination and decoding and increases a success rate of decoding.

14 Claims, 6 Drawing Sheets

(58) Field of Classification Search
CPC ..... H04L 5/0053; H04L 5/0092; H04L 5/001;
H04L 5/0055; H04L 5/0044; H04L
5/0094; H04W 72/042; H04W 72/044
See application file for complete search history.

(56) References Cited

U.S. PATENT DOCUMENTS

| | | | |
|---|---|---|---|
| 2011/0205978 A1 | 8/2011 | Nory et al. | |
| 2012/0039275 A1* | 2/2012 | Chen | H04L 5/001 370/329 |
| 2012/0082145 A1* | 4/2012 | Chen | H04L 1/1861 370/338 |
| 2012/0087396 A1 | 4/2012 | Nimbalker et al. | |
| 2012/0239998 A1* | 9/2012 | Park | H04L 1/1896 714/748 |
| 2013/0039296 A1* | 2/2013 | Damnjanovic | H04W 72/1289 370/329 |
| 2013/0155914 A1* | 6/2013 | Wang | H04L 1/0026 370/280 |
| 2013/0308550 A1* | 11/2013 | Yin | H04W 72/044 370/329 |
| 2013/0322392 A1* | 12/2013 | Abe | H04J 11/0056 370/329 |
| 2014/0314038 A1 | 10/2014 | Seo et al. | |
| 2015/0215078 A1* | 7/2015 | Chen | H04L 5/0055 370/277 |
| 2016/0174259 A1* | 6/2016 | Mukherjee | H04L 1/1816 370/280 |
| 2017/0338912 A1* | 11/2017 | Nigam | H04L 1/1812 |
| 2019/0082452 A1* | 3/2019 | Zheng | H04L 5/0007 |

FOREIGN PATENT DOCUMENTS

| | | |
|---|---|---|
| CN | 102349346 A | 2/2012 |
| CN | 103155470 A | 6/2013 |
| CN | 103312438 A | 9/2013 |
| CN | 105992378 A | 10/2016 |
| EP | 3297365 B1 | 8/2019 |
| WO | 2011/137177 A1 | 11/2011 |
| WO | 2013060246 A1 | 5/2013 |
| WO | 2016072820 A1 | 5/2016 |
| WO | 2016122390 A2 | 8/2016 |
| WO | 2016197899 A1 | 12/2016 |

* cited by examiner

METHOD, TERMINAL DEVICE, AND NETWORK DEVICE FOR TIME-FREQUENCY RESOURCE BUNDLING IN TRANSMITTING DATA ON MULTIPLE CARRIERS

CROSS-REFERENCE TO RELATED APPLICATIONS

The disclosure is a continuation of International Application No. PCT/CN2017/118191, filed on Dec. 25, 2017, which claims priority to Chinese Patent Application No. 201611242404.7, filed on Dec. 29, 2016. The disclosures of the aforementioned applications are hereby incorporated by reference in their entireties.

TECHNICAL FIELD

Embodiments of the disclosure relate to the communications field, and more specifically, to a method for transmitting data on multiple carriers, a terminal device, and a network device.

BACKGROUND

To better meet increasing service type requirements, it is required that a new access technology such as a 5G (New Radio, NR) technology should not only support Enhanced Mobile Broadband (eMBB) and broadcast services already supported in Long Term Evolution (LTE), but also additionally introduce two new service types: Ultra-Reliable and Low Latency Communications (URLLC) and Massive Machine Type Communications (mMTC). There is an obvious difference between service features, reliability requirements, or latency requirements of the service types.

For the URLLC service, an expected latency is very low, and a minimum latency is only 1 ms. Obviously, because the URLLC service is latency-critical, a scheduling time thereof is short, and a resource needs to be scheduled and allocated immediately when data arrives. Basically, there should be no waiting. In addition, the URLLC service also has a very high requirement on reliability, and generally requires ultra-high reliability up to 99.999%.

In LTE, a hybrid automatic repeat request (HARQ) entity exists at a Media Access Control (MAC) layer. When sending data, the MAC layer multiplexes a logical channel and a control unit to form a corresponding transport block (TB), and then delivers the corresponding TB to the HARQ entity. The HARQ entity allocates HARQ information and the TB to a corresponding HARQ process. Each HARQ entity includes a plurality of parallel HARQ processes, and each HARQ process has a HARQ process number.

In addition, each HARQ process has a corresponding HARQ buffer. A received error data packet is stored in a HARQ buffer, and is combined with a subsequently received retransmitted data packet (this is a "soft combination" process), to obtain a data packet that is more reliable than a separately decoded data packet. Then the combined data packet is decoded. If failure still occurs, "requesting retransmission, and then performing soft combination" is repeated.

In a case of carrier aggregation, one HARQ entity exists in each carrier. The HARQ entity manages a HARQ process and a HARQ buffer of the carrier. To-be-buffered uplink data or downlink data received on the carrier needs to be placed in the buffer of the HARQ process corresponding to the carrier. In the prior art, the HARQ process is limited in each carrier. When data is transmitted in different carriers simultaneously, inter-carrier soft combination and decoding cannot be implemented, and therefore a success rate of decoding is reduced.

SUMMARY

Embodiments of the disclosure provide a method for transmitting data on multiple carriers, a terminal device, and a network device, to implement inter-carrier soft combination and decoding and increase a success rate of decoding.

According to a first aspect, a method for transmitting data on multiple carriers is provided, where the method includes: receiving, by a terminal device, instruction information sent by a network device, where the instruction information is used to instruct the terminal device to perform cross-carrier time-frequency resource bundling; bundling, by the terminal device, time-frequency resources on a first type of carrier and a second type of carrier according to the instruction information; and sending or receiving, by the terminal device, data on the bundled time-frequency resources.

In this embodiment of the disclosure, the terminal device performs subframe bundling on the time-frequency resources on the first type of carrier and the second type of carrier, thereby implementing inter-carrier soft combination and decoding and increasing a success rate of decoding.

With reference to the first aspect, in a first possible implementation of the first aspect, the time-frequency resources carry data information, and the method further includes: receiving, by the terminal device on the first type of carrier and the second type of carrier separately, first control information sent by the network device, where a HARQ entity to which a HARQ process indicated by the first control information belongs is a HARQ entity of the first type of carrier.

In some possible implementations, after the terminal device receives, on the first type of carrier and the second type of carrier, the data information sent by the network device, the sending or receiving, by the terminal device, data on the bundled time-frequency resources includes: performing, in a buffer of the HARQ process of the first type of carrier, soft combination on the data information carried by the time-frequency resources on the first type of carrier and the second type of carrier.

With reference to the first aspect, in a second possible implementation of the first aspect, the time-frequency resources carry data information, and the method further includes: receiving, by the terminal device on the first type of carrier, second control information sent by the network device, where the second control information is used to jointly schedule the first type of carrier and the second type of carrier.

With reference to the second possible implementation of the first aspect, in a third possible implementation of the first aspect, the second control information is further used to indicate a redundancy version RV of data information on a first carrier, the first carrier is any carrier in the first type of carrier and the second type of carrier, and the method further includes: determining, by the terminal device, an RV of data information on a carrier other than the first carrier in the first carrier and the second carrier according to a first predetermined rule; and the bundling, by the terminal device, time-frequency resources on a first type of carrier and a second type of carrier according to the instruction information includes: bundling, by the terminal device according to the instruction information, redundancy versions of data information carried by the time-frequency resources on the first type of carrier and the second type of carrier.

In some possible implementations, after the terminal device receives, on the first type of carrier and the second type of carrier, the data information sent by the network device, the sending or receiving, by the terminal device, data on the bundled time-frequency resources includes: performing, in a buffer of the HARQ process of the first type of carrier, soft combination on the redundancy versions of the data information carried by the time-frequency resources on the first type of carrier and the second type of carrier.

With reference to the third possible implementation of the first aspect, in a fourth possible implementation of the first aspect, the first predetermined rule includes: the second control information indicates an RV of data information on the first type of carrier, and the terminal device determines an RV of data information on the second type of carrier based on a carrier index; or the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

With reference to any one of the first to the fourth possible implementations of the first aspect, in a fifth possible implementation of the first aspect, after the terminal device receives the data information on the bundled time-frequency resources, the method further includes: sending, by the terminal device, first feedback information on the first type of carrier to the network device, where the first feedback information is used to indicate that the data information on the first type of carrier and the second type of carrier fails to be received; or sending, by the terminal device, second feedback information on the first type of carrier to the network device, where the second feedback information is used to indicate that at least one piece of the data information on the first type of carrier and the second type of carrier is successfully received.

With reference to any one of the first to the fourth possible implementations of the first aspect, in a sixth possible implementation of the first aspect, after the terminal device sends the data information on the bundled time-frequency resources, the method further includes: receiving, by the terminal device on the first type of carrier, first feedback information sent by the network device, where the first feedback information is used to indicate that the data information on the first type of carrier and the second type of carrier fails to be sent; or receiving, by the terminal device on the first type of carrier, second feedback information sent by the network device, where the second feedback information is used to indicate that at least one piece of the data information on the first type of carrier and the second type of carrier is successfully sent.

In this embodiment of the disclosure, the terminal device bundles the data information carried by the time-frequency resources on the first type of carrier and the second type of carrier, thereby implementing inter-carrier soft combination and decoding and increasing the success rate of decoding.

With reference to the first aspect, in a seventh possible implementation of the first aspect, the time-frequency resources carry signaling information, the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

In this embodiment of the disclosure, the terminal device bundles the signaling information carried by the time-frequency resources on the first type of carrier and the second type of carrier, thereby ensuring reliability of the signaling information.

With reference to any one of the first aspect and the first to the seventh possible implementations of the first aspect, in an eighth possible implementation of the first aspect, the first type of carrier and the second type of carrier are configured by the network device, a quantity of the first type of carrier is 1, and a quantity of the second type of carrier is greater than or equal to 1.

According to a second aspect, a method for transmitting data on multiple carriers is provided, where the method includes: configuring, by a network device, a terminal device to perform cross-carrier time-frequency resource bundling; sending, by the network device, instruction information to the terminal device, where the instruction information is used to instruct the terminal device to perform cross-carrier time-frequency resource bundling, and the cross-carrier time-frequency resource bundling operation is bundling, by the terminal device, time-frequency resources on a first type of carrier and a second type of carrier; and sending or receiving, by the network device, data on the bundled time-frequency resources.

In this embodiment of the disclosure, the network device instructs the terminal device to perform subframe bundling on the time-frequency resources on the first type of carrier and the second type of carrier, thereby implementing inter-carrier soft combination and decoding and increasing a success rate of decoding.

With reference to the second aspect, in a first possible implementation of the second aspect, the time-frequency resources carry data information, and the method further includes: sending, by the network device, first control information on the first type of carrier and the second type of carrier separately to the terminal device, where a HARQ entity to which a HARQ process indicated by the first control information belongs is a HARQ entity of the first type of carrier.

In some possible implementations, after the network device receives, on the first type of carrier and the second type of carrier, the data information sent by the terminal device, the method further includes: performing, by the network device in a buffer of the HARQ process of the first type of carrier, soft combination on the data information carried by the time-frequency resources on the first type of carrier and the second type of carrier.

With reference to the second aspect, in a second possible implementation of the second aspect, the time-frequency resources carry data information, and the method further includes: sending, by the network device, second control information on the first type of carrier, where the second control information is used to jointly schedule the first type of carrier and the second type of carrier.

With reference to the second possible implementation of the second aspect, in a third possible implementation of the second aspect, the second control information is further used to indicate a redundancy version RV of data information on a first carrier, the first carrier is any carrier in the first type of carrier and the second type of carrier, and the method further includes: determining, by the network device, an RV of data information on a carrier other than the first carrier in the first carrier and the second carrier according to a second predetermined rule; and the bundling, by the terminal device, time-frequency resources on a first type of carrier and a second type of carrier includes: bundling, by the terminal device according to the instruction information, redundancy versions of data information carried by the time-frequency resources on the first type of carrier and the second type of carrier.

In some possible implementations, after the network device receives, on the first type of carrier and the second type of carrier, the data information sent by the network device, the method further includes: performing, by the network device in a buffer of the HARQ process of the first type of carrier, soft combination on the redundancy versions of the data information carried by the time-frequency resources on the first type of carrier and the second type of carrier.

With reference to the third possible implementation of the second aspect, in a fourth possible implementation of the second aspect, the second predetermined rule includes: the second control information indicates an RV of data information on the first type of carrier, and the network device determines an RV of data information on the second type of carrier based on a carrier index; or the second control information indicates an RV of data information on a second carrier, the second carrier is any carrier in the second type of carrier, and the network device determines an RV of data information on a carrier other than the second carrier in the first type of carrier and the second type of carrier based on a carrier index.

With reference to any one of the first to the fourth possible implementations of the second aspect, in a fifth possible implementation of the second aspect, after the network device sends the data information on the bundled time-frequency resources, the method further includes: receiving, by the network device on the first type of carrier, first feedback information sent by the terminal device, where the first feedback information is used to indicate that the data information on the first type of carrier and the second type of carrier fails to be sent; or receiving, by the network device on the first type of carrier, second feedback information sent by the terminal device, where the second feedback information is used to indicate that at least one piece of the data information on the first type of carrier and the second type of carrier is successfully sent.

With reference to any one of the first to the fourth possible implementations of the second aspect, in a sixth possible implementation of the second aspect, after the network device receives the data information on the bundled time-frequency resources, the method further includes: sending, by the network device, first feedback information on the first type of carrier to the terminal device, where the first feedback information is used to indicate that the data information on the first type of carrier and the second type of carrier fails to be received; or sending, by the network device, second feedback information on the first type of carrier to the terminal device, where the second feedback information is used to indicate that at least one piece of the data information on the first type of carrier and the second type of carrier is successfully received.

In this embodiment of the disclosure, the network device instructs the terminal device to bundle the data information carried by the time-frequency resources on the first type of carrier and the second type of carrier, thereby implementing inter-carrier soft combination and decoding and increasing the success rate of decoding.

With reference to the second aspect, in a seventh possible implementation of the second aspect, the time-frequency resources carry signaling information, and the method further includes: configuring, by the network device, the terminal device to perform cross-carrier signaling information repetition, where the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

In this embodiment of the disclosure, the network device instructs the terminal device to bundle the signaling information carried by the time-frequency resources on the first type of carrier and the second type of carrier, thereby ensuring reliability of the signaling information.

With reference to any one of the second aspect and the first to the seventh possible implementations of the second aspect, in an eighth possible implementation of the second aspect, the first type of carrier and the second type of carrier are configured by the network device, a quantity of the first type of carrier is 1, and a quantity of the second type of carrier is greater than or equal to 1.

According to a third aspect, a terminal device is provided, where the terminal device includes a transceiver module, configured to receive instruction information sent by a network device, where the instruction information is used to instruct the terminal device to perform cross-carrier time-frequency resource bundling; and a processing module, configured to bundle time-frequency resources on a first type of carrier and a second type of carrier according to the instruction information; where the transceiver module is further configured to send or receive data on the bundled time-frequency resources.

With reference to the third aspect, in a first possible implementation of the third aspect, the time-frequency resources carry data information, and the transceiver module is further configured to receive, on the first type of carrier and the second type of carrier separately, first control information sent by the network device, where a HARQ entity to which a HARQ process indicated by the first control information belongs is a HARQ entity of the first type of carrier.

With reference to the third aspect, in a second possible implementation of the third aspect, the time-frequency resources carry data information, and the transceiver module is further configured to receive, on the first type of carrier, second control information sent by the network device, where the second control information is used to jointly schedule the first type of carrier and the second type of carrier.

With reference to the second possible implementation of the third aspect, in a third possible implementation of the third aspect, the second control information is further used to indicate a redundancy version RV of data information on a first carrier, and the first carrier is any carrier in the first type of carrier and the second type of carrier; the processing module is further configured to determine an RV of data information on a carrier other than the first carrier in the first carrier and the second carrier according to a first predetermined rule; and the processing module is further configured to bundle, according to the instruction information, redundancy versions of data information carried by the time-frequency resources on the first type of carrier and the second type of carrier.

With reference to the third possible implementation of the third aspect, in a fourth possible implementation of the third aspect, the first predetermined rule includes: the second control information indicates an RV of data information on the first type of carrier, and the terminal device determines an RV of data information on the second type of carrier based on a carrier index; or the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

With reference to any one of the first to the fourth possible implementations of the third aspect, in a fifth possible implementation of the third aspect, the transceiver module is further configured to send first feedback information on the first type of carrier to the network device, where the first feedback information is used to indicate that the data information on the first type of carrier and the second type of carrier fails to be received; or send second feedback information on the first type of carrier to the network device, where the second feedback information is used to indicate that at least one piece of the data information on the first type of carrier and the second type of carrier is successfully received.

With reference to any one of the first to the fourth possible implementations of the third aspect, in a sixth possible implementation of the third aspect, the transceiver module is further configured to receive, on the first type of carrier, first feedback information sent by the network device, where the first feedback information is used to indicate that the data information on the first type of carrier and the second type of carrier fails to be sent; or receive, on the first type of carrier, second feedback information sent by the network device, where the second feedback information is used to indicate that at least one piece of the data information on the first type of carrier and the second type of carrier is successfully sent.

With reference to the third aspect, in a seventh possible implementation of the third aspect, the time-frequency resources carry signaling information, the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

With reference to any one of the third aspect and the first to the seventh possible implementations of the third aspect, in an eighth possible implementation of the third aspect, the first type of carrier and the second type of carrier are configured by the network device, a quantity of the first type of carrier is 1, and a quantity of the second type of carrier is greater than or equal to 1.

According to a fourth aspect, a network device is provided, where the network device includes a processing module, configured to configure a terminal device to perform cross-carrier time-frequency resource bundling; and a transceiver module, configured to send instruction information to the terminal device, where the instruction information is used to instruct the terminal device to perform cross-carrier time-frequency resource bundling, and the cross-carrier time-frequency resource bundling operation is bundling, by the terminal device, time-frequency resources on a first type of carrier and a second type of carrier; where the transceiver module is further configured to send or receive data on the bundled time-frequency resources.

With reference to the fourth aspect, in a first possible implementation of the fourth aspect, the time-frequency resources carry data information, and the transceiver module is further configured to send first control information on the first type of carrier and the second type of carrier separately to the terminal device, where a HARQ entity to which a HARQ process indicated by the first control information belongs is a HARQ entity of the first type of carrier.

With reference to the fourth aspect, in a second possible implementation of the fourth aspect, the time-frequency resources carry data information, and the transceiver module is further configured to send second control information on the first type of carrier, where the second control information is used to jointly schedule the first type of carrier and the second type of carrier.

With reference to the second possible implementation of the fourth aspect, in a third possible implementation of the fourth aspect, the second control information is further used to indicate a redundancy version RV of data information on a first carrier, and the first carrier is any carrier in the first type of carrier and the second type of carrier; the processing module is further configured to determine an RV of data information on a carrier other than the first carrier in the first carrier and the second carrier according to a second predetermined rule; and the processing module is further configured to bundle, according to the instruction information, redundancy versions of data information carried by the time-frequency resources on the first type of carrier and the second type of carrier.

With reference to the third possible implementation of the fourth aspect, in a fourth possible implementation of the fourth aspect, the second predetermined rule includes: the second control information indicates an RV of data information on the first type of carrier, and the network device determines an RV of data information on the second type of carrier based on a carrier index; or the second control information indicates an RV of data information on a second carrier, the second carrier is any carrier in the second type of carrier, and the network device determines an RV of data information on a carrier other than the second carrier in the first type of carrier and the second type of carrier based on a carrier index.

With reference to any one of the first to the fourth possible implementations of the fourth aspect, in a fifth possible implementation of the fourth aspect, the transceiver module is further configured to receive, on the first type of carrier, first feedback information sent by the terminal device, where the first feedback information is used to indicate that the data information on the first type of carrier and the second type of carrier fails to be sent; or receive, on the first type of carrier, second feedback information sent by the terminal device, where the second feedback information is used to indicate that at least one piece of the data information on the first type of carrier and the second type of carrier is successfully sent.

With reference to any one of the first to the fourth possible implementations of the fourth aspect, in a sixth possible implementation of the fourth aspect, the transceiver module is further configured to send first feedback information on the first type of carrier to the terminal device, where the first feedback information is used to indicate that the data information on the first type of carrier and the second type of carrier fails to be received; or send second feedback information on the first type of carrier to the terminal device, where the second feedback information is used to indicate that at least one piece of the data information on the first type of carrier and the second type of carrier is successfully received.

With reference to the fourth aspect, in a seventh possible implementation of the fourth aspect, the time-frequency resources carry signaling information, and the processing module is further configured to configure the terminal device to perform cross-carrier signaling information repetition, where the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

With reference to any one of the fourth aspect and the first to the seventh possible implementations of the fourth aspect, in an eighth possible implementation of the fourth aspect, the first type of carrier and the second type of carrier are configured by the network device, a quantity of the first type of carrier is 1, and a quantity of the second type of carrier is greater than or equal to 1.

According to a fifth aspect, a terminal device is provided, where the terminal device includes a processor, a memory, a receiver, and a transmitter. The memory is configured to store an instruction. The processor is configured to execute the instruction stored in the memory, control the receiver to receive a signal, and control the transmitter to send a signal.

The processor is configured to execute the instruction stored in the memory, to perform an operation in the method in the first aspect or any possible implementation of the first aspect.

According to a sixth aspect, a network device is provided, where the network device includes a processor, a memory, a receiver, and a transmitter. The memory is configured to store an instruction. The processor is configured to execute the instruction stored in the memory, control the receiver to receive a signal, and control the transmitter to send a signal.

The processor is configured to execute the instruction stored in the memory, to perform an operation in the method in the second aspect or any possible implementation of the second aspect.

According to a seventh aspect, a computer-readable medium is provided and is configured to store a computer program, where the computer program includes an instruction used to perform the method in the first aspect or any possible implementation of the first aspect, or the second aspect or any possible implementation of the second aspect.

DESCRIPTION OF EMBODIMENTS

The following describes technical solutions in embodiments of the disclosure with reference to accompanying drawings.

Figure 1:
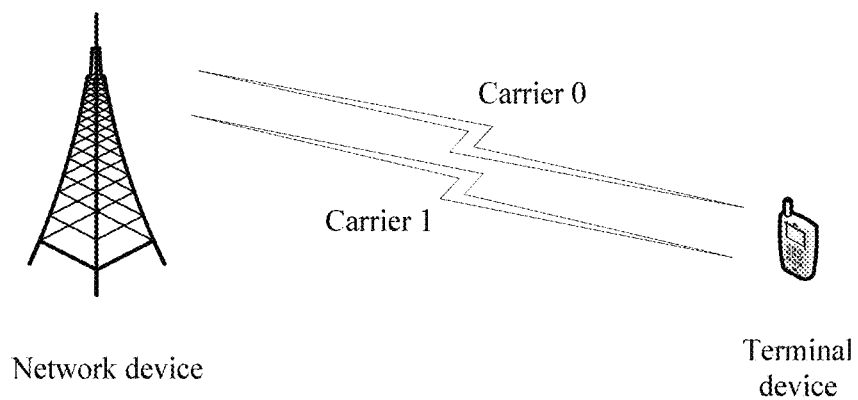
FIG. 1 is a schematic diagram of an application scenario of a technical solution according to an embodiment of the disclosure.

FIG. 1 is a schematic diagram of an application scenario of a technical solution according to an embodiment of the disclosure. As shown in FIG. 1, the disclosure is applied to communication between a terminal device and a network device in a scenario of carrier aggregation, or may be applied to communication between terminal devices having functions of a terminal device and a network device.

It should be understood that, the scenario of carrier aggregation shown in FIG. 1 includes two carriers: a carrier 0 and a carrier 1. The scenario of carrier aggregation may also be a scenario in which more than two carriers coexist, but the disclosure is not limited thereto.

It should also be understood that, carriers in the embodiments of the disclosure may be a serving cell, a subband, a time-frequency resource set, or the like. The disclosure is not limited thereto.

It should also be understood that, the technical solutions in the embodiments of the disclosure may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunications System (UMTS), and a future 5th-Generation (5G) communications system.

The disclosure describes the embodiments with reference to a terminal device. The terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

The disclosure describes the embodiments with reference to a network device. The network device may be a device configured to communicate with a terminal device, for example, may be a combination of a base station (Base Transceiver Station, BTS) and a base station controller (BSC) in a GSM or CDMA system, or may be a base station (NodeB, NB) and a radio network controller (RNC) in a WCDMA system, or may be an evolved NodeB (eNB or eNodeB) in an LTE system. Alternatively, the network device may be a relay station, an access point, an in-vehicle device, a wearable device, and an access network device in a future 5G network, for example, a next-generation base station, or an access network device in a future evolved PLMN network.

Figure 2:
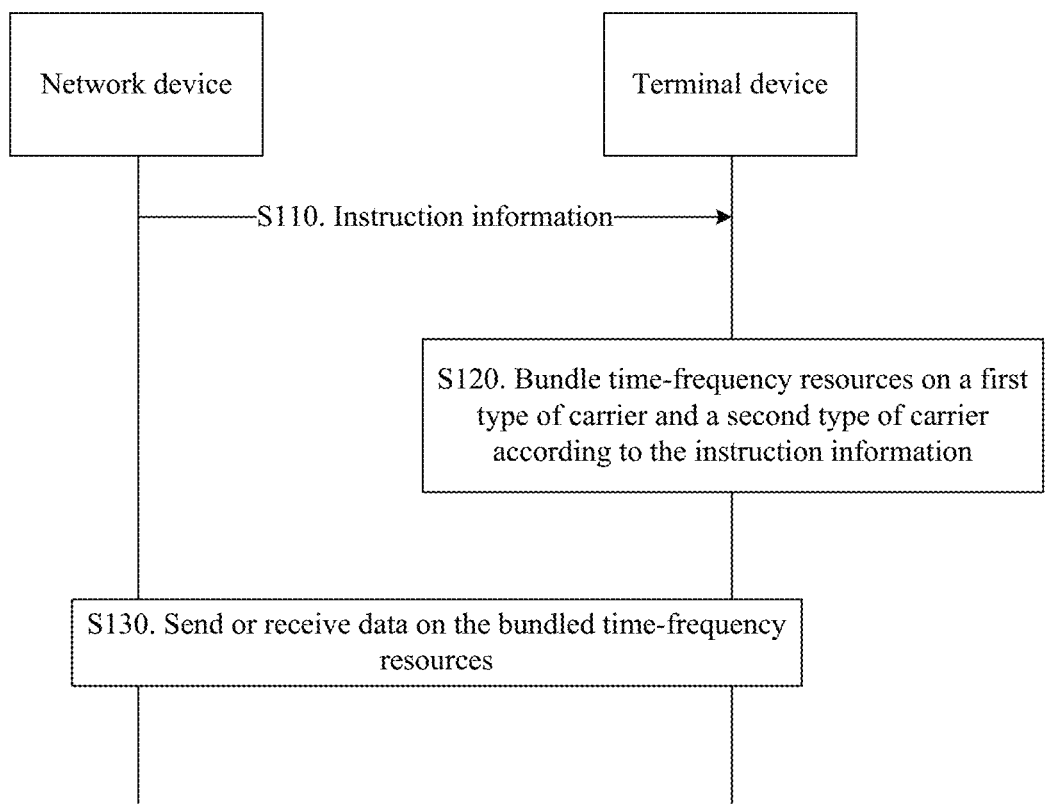
FIG. 2 is a schematic flowchart of a method for transmitting data on multiple carriers according to an embodiment of the disclosure.

FIG. 2 is a schematic flowchart of a method for transmitting data on multiple carriers according to an embodiment of the disclosure. A network device in FIG. 2 may be the network device in FIG. 1, and a terminal device may be the terminal device in FIG. 1. In an actual system, a quantity of carriers may not be limited to an example in this embodiment of the disclosure. This is not described again hereinafter.

Operation S110. A terminal device receives instruction information sent by a network device, where the instruction information is used to instruct the terminal device to perform cross-carrier time-frequency resource bundling.

Operation S120. The terminal device bundles time-frequency resources on a first type of carrier and a second type of carrier according to the instruction information.

Operation S130. The terminal device or the network device sends or receives data on the bundled time-frequency resources.

Specifically, the network device sends the instruction information to the terminal device, where the instruction information is used to instruct the terminal device to perform cross-carrier time-frequency resource bundling; after receiving the instruction information, the terminal device bundles the time-frequency resources on the first type of carrier and the second type of carrier; and the terminal device or the network device sends or receives the data on the bundled time-frequency resources.

In one embodiment, the first type of carrier and the second type of carrier are configured by the network device, a quantity of the first type of carrier is 1, and a quantity of the second type of carrier is greater than or equal to 1.

Figure 3:
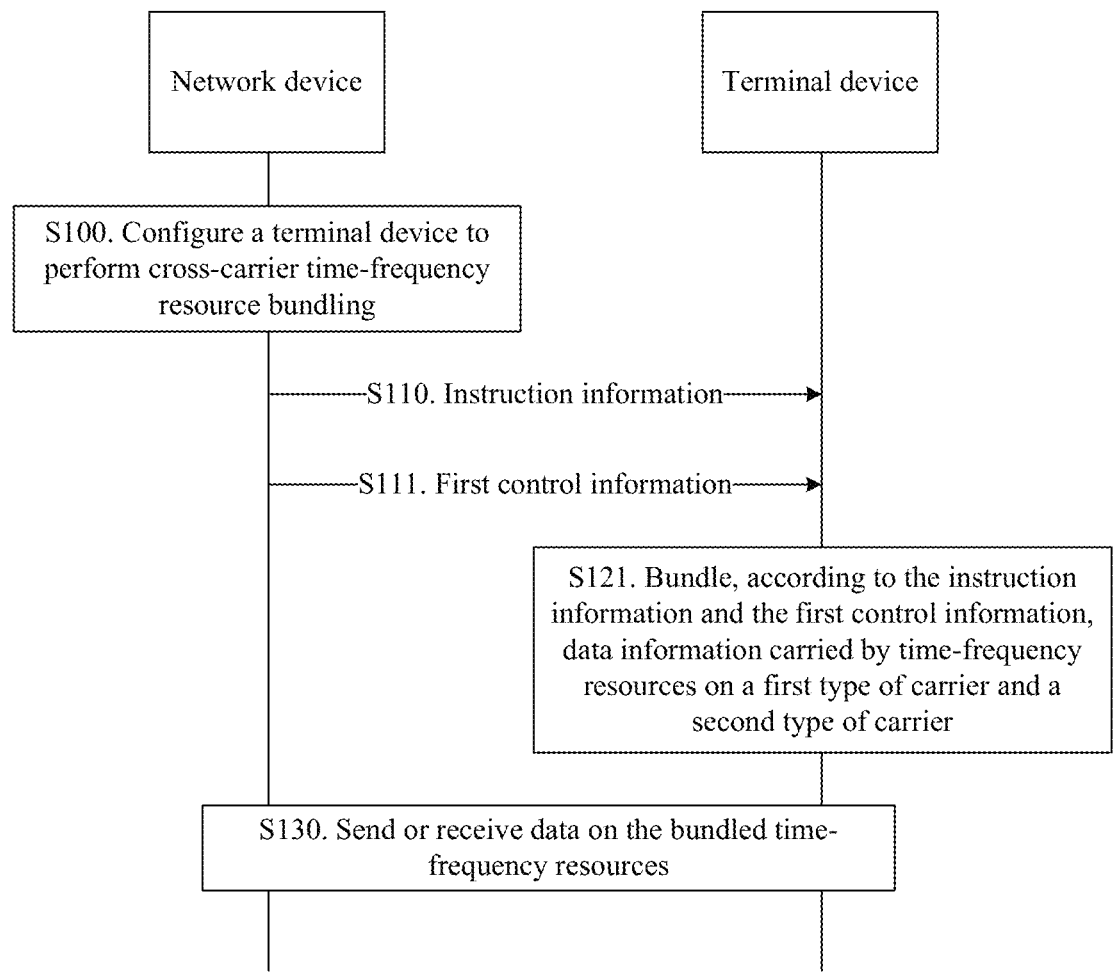
FIG. 3 is another schematic flowchart of a method for transmitting data on multiple carriers according to an embodiment of the disclosure.

FIG. 3 is another schematic flowchart of a method for transmitting data on multiple carriers according to an embodiment of the disclosure.

In one embodiment, as shown in FIG. 3, before operation S110, operation S100 may be further performed.

Operation S100. A network device configures a terminal device to perform cross-carrier time-frequency resource bundling.

Specifically, by using higher layer signaling, the network device configures the terminal device to perform cross-carrier time-frequency resource bundling. When the terminal device is configured to perform cross-carrier bundling, the network device configures one carrier as a first type of carrier, and one or more carriers except the first type of carrier as a second type of carrier by using higher layer signaling. The terminal device receives instruction information sent by the network device, where the instruction information is used to instruct the terminal device to perform cross-carrier time-frequency resource bundling. The terminal device performs subframe bundling on time-frequency resources on the first type of carrier and the second type of carrier, and then sends or receives data on the bundled time-frequency resources.

For example, when the network device sends data in the first type of carrier and the second type of carrier as a transmit end, the terminal device receives data information on the first type of carrier and the second type of carrier as a receive end. The terminal device bundles the data information or signaling information carried by the time-frequency resources on the first type of carrier and the second type of carrier, and places the bundled data information in a HARQ process in the first type of carrier for soft combination and decoding.

For another example, the terminal device may further send data to the network device as a transmit end, and the network device receives the data in the first type of carrier and the second type of carrier as a receive end. In this case, the terminal device performs subframe bundling on the time-frequency resources on the first type of carrier and the second type of carrier. The network device places the bundled data in a HARQ process in the first type of carrier for soft combination and decoding.

It should also be understood that, a time-frequency resource in this embodiment of the disclosure may be a slot, a mini-slot, a slot obtained after multi-slot aggregation, a subframe, or the like. The disclosure is not limited thereto.

It should also be understood that, the time-frequency resources may be same time domain resources in different carriers, or may be different time domain resources in different carriers. The disclosure is not limited thereto.

It should also be understood that, the time-frequency resources may carry data information, or may carry signaling information. The disclosure is not limited thereto.

In this embodiment of the disclosure, the terminal device performs subframe bundling on the time-frequency resources on the first type of carrier and the second type of carrier, thereby implementing inter-carrier soft combination and decoding and increasing a success rate of decoding.

In one embodiment, in this embodiment of the disclosure, the time-frequency resources carry data information. As shown in FIG. 3, before the time-frequency resources on the first type of carrier and the second type of carrier are bundled in S120, the following operation is further included.

Operation S111. The terminal device receives, on the first type of carrier and the second type of carrier separately, first control information sent by the network device, where a HARQ entity to which a HARQ process indicated by the first control information belongs is a HARQ entity of the first type of carrier.

Specifically, when the terminal device is configured to perform cross-carrier bundling, the network device sends the first control information on the first type of carrier and the second type of carrier separately to the terminal device as a transmit end; and the terminal device receives, on the first type of carrier and the second type of carrier separately as a receive end, the first control information sent by the network device, where the HARQ entity to which the HARQ process indicated by the first control information belongs is the HARQ entity of the first type of carrier.

As shown in FIG. 3, S120 in which the terminal device bundles the time-frequency resources on the first type of carrier and the second type of carrier according to the instruction information may be further implemented by the following operation.

Operation S121. The terminal device bundles, according to the instruction information and the first control information, data information carried by the time-frequency resources on the first type of carrier and the second type of carrier.

In one embodiment, after the terminal device bundles the data information carried by the time-frequency resources on the first type of carrier and the second type of carrier, the terminal device serving as a receive end may place the bundled data information in a buffer of the HARQ process in the first type of carrier for soft combination and decoding.

Figure 4:
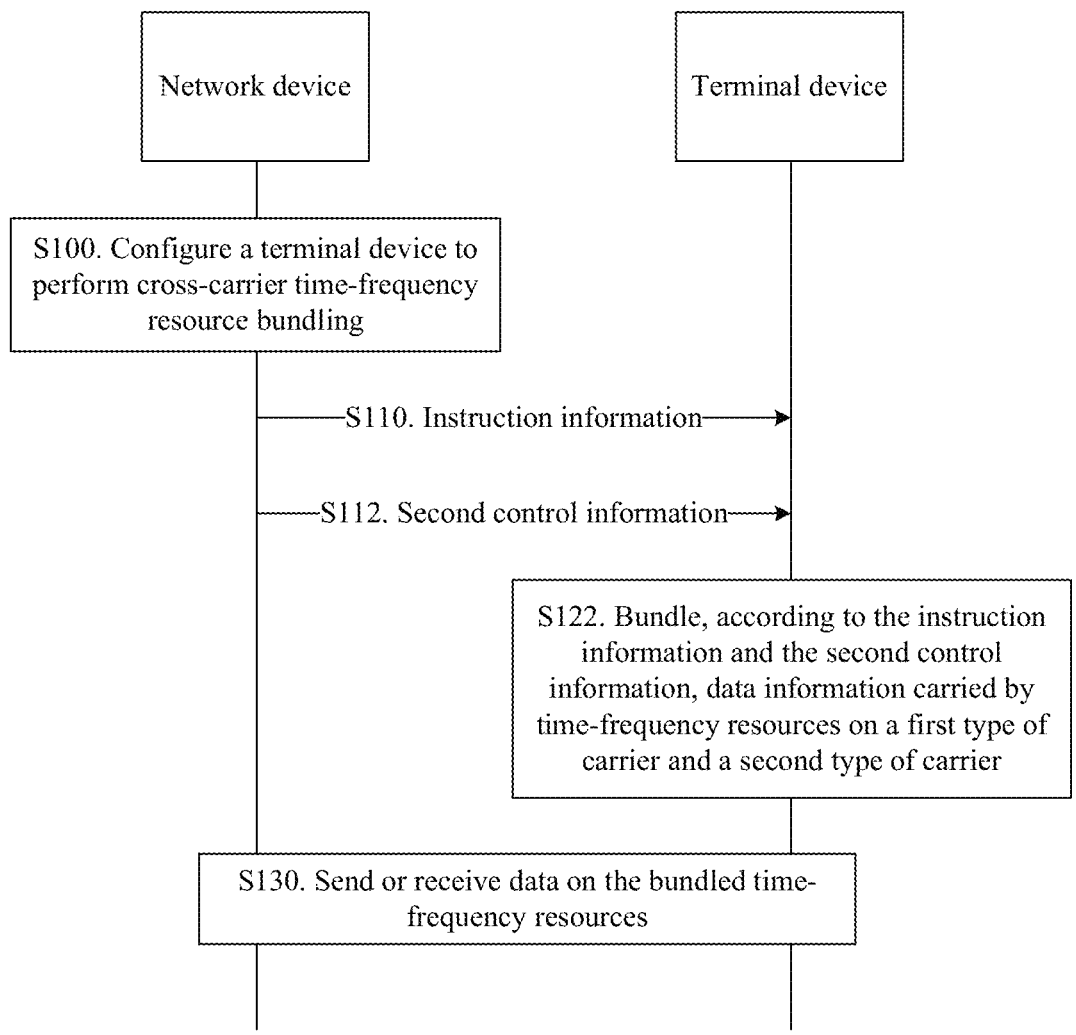
FIG. 4 is still another schematic flowchart of a method for transmitting data on multiple carriers according to an embodiment of the disclosure.

FIG. 4 is still another schematic flowchart of a method for transmitting data on multiple carriers according to an embodiment of the disclosure.

In one embodiment, in this embodiment of the disclosure, the time-frequency resources carry data information. As shown in FIG. 4, before the time-frequency resources on the first type of carrier and the second type of carrier are bundled in S120, the following operation is further included.

Operation S112. The terminal device receives, on the first type of carrier, second control information sent by the network device, where the second control information is used to jointly schedule the first type of carrier and the second type of carrier.

Specifically, when the terminal device is configured to perform cross-carrier bundling, the network device sends the second control information on the first type of carrier to the terminal device as a transmit end; and the terminal device receives, on the first type of carrier as a receive end, the second control information sent by the network device, where the second control information is used to jointly schedule the first type of carrier and the second type of carrier and indicate locations of the time-frequency resources used for data transmission in the first type of carrier and the second type of carrier, and a HARQ process indicated by the second control information is a HARQ process managed by a HARQ entity of the first type of carrier.

As shown in FIG. 4, S120 in which the terminal device bundles the time-frequency resources on the first type of carrier and the second type of carrier according to the instruction information may be further implemented by the following operation.

Operation S122. The terminal device bundles, according to the instruction information and the second control information, data information carried by the time-frequency resources on the first type of carrier and the second type of carrier.

In one embodiment, after the terminal device bundles the data information carried by the time-frequency resources on the first type of carrier and the second type of carrier, the terminal device serving as a receive end may place the bundled data information in a buffer of the HARQ process in the first type of carrier for soft combination and decoding.

In one embodiment, the second control information is further used to indicate a redundancy version (RV) of data information on a first carrier, the first carrier is any carrier in the first type of carrier and the second type of carrier, and the terminal device determines an RV of data information on a carrier other than the first carrier in the first carrier and the second carrier according to a first predetermined rule; and that the terminal device bundles time-frequency resources on a first type of carrier and a second type of carrier according to the instruction information includes: the terminal device bundles, according to the instruction information, redundancy versions of data information carried by the time-frequency resources on the first type of carrier and the second type of carrier.

Specifically, the terminal device receives the second control information on the first type of carrier, where the second control information is used to jointly schedule the first type of carrier and the second type of carrier, and an RV field in the second control information indicates an RV number used by any carrier in the first type of carrier and the second type of carrier. The terminal device fetches RVs of data information in other carriers in the first type of carrier and the second type of carrier cyclically according to the first predetermined rule; or the network device fetches RVs of data information in other carriers in the first type of carrier and the second type of carrier cyclically according to a second predetermined rule.

In one embodiment, the network device determines an RV of data information on a carrier other than the first carrier in the first carrier and the second carrier according to the second predetermined rule.

In one embodiment, the first predetermined rule includes: the second control information indicates an RV of data information on the first type of carrier, and the terminal device determines an RV of data information on the second type of carrier based on a carrier index; or the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

It should be understood that, the first predetermined rule may be either of the foregoing two manners or may be another manner. Any manner of determining an RV of data information in another carrier in the first type of carrier and the second type of carrier based on an RV of data information on the first carrier that is any carrier in the first type of carrier and the second type of carrier shall fall within the protection scope of the disclosure.

It should also be understood that, the second predetermined rule may be the same as the first predetermined rule, or may be different from the first predetermined rule. For brevity, details are not described again herein.

For example, if a carrier 0 is the first type of carrier, and a carrier 1 is the second type of carrier, the terminal device receives second control information on a time-frequency resource on the carrier 0, where the second control information is information for jointly scheduling the carrier 0 and the carrier 1, and indicates locations of time-frequency resources allocated on the carrier 0 and the carrier 1. The second control information is further used to indicate an RV field of data information on the carrier 0, where a value of the RV field is 0, indicating that an RV version of the data information sent on the carrier 0 is RV 0. The terminal device fetches an RV of data information in another carrier in the first type of carrier and the second type of carrier based on a carrier index in a sequence of [0, 2, 3, 1], that is, a redundancy version on the carrier 1 is RV 2.

For another example, if a carrier 0 is the first type of carrier, and a carrier 1 and a carrier 2 are the second type of carrier, the terminal device receives second control information on a time-frequency resource on the carrier 0, where the second control information is information for jointly scheduling the carrier 0 and the carrier 1, and indicates locations of time-frequency resources allocated on the carrier 0 and the carrier 1. The second control information is further used to indicate an RV field of data information on the carrier 1, where a value of the RV field is 0, indicating that an RV version of the data information sent on the carrier 1 is RV 0. The terminal device fetches RVs of data information in other carriers in the first type of carrier and the second type of carrier based on carrier indices in a sequence of [0, 2, 3, 1], that is, redundancy versions on the carrier 0 and the carrier 2 are RV 2 and RV 3.

In one embodiment, after the terminal device receives the data information on the bundled time-frequency resources, the method further includes:

the terminal device sends first feedback information on the first type of carrier to the network device, where the first feedback information is used to indicate that the data information on the first type of carrier and the second type of carrier fails to be received; or the terminal device sends second feedback information on the first type of carrier to the network device, where the second feedback information is used to indicate that at least one piece of the data information on the first type of carrier and the second type of carrier is successfully received.

For example, if a carrier 0 is the first type of carrier, and a carrier 1 is the second type of carrier, the network device sends data information on the carrier 0 and the carrier 1 as a transmit end, and the terminal device receives bundled data information on the carrier 0 and the carrier 1 separately. If the terminal device performs incorrect decoding in both the carrier 0 and the carrier 1, the terminal device feeds back a NACK on a time-frequency resource on the carrier 0 to the network device, indicating that the two times of data reception by the terminal device both fail; or if the terminal device performs correct decoding in at least one of the carrier 0 and the carrier 1, the terminal device returns an ACK on a time-frequency resource on the carrier 0 to the network device, indicating that the terminal device successfully receives at least one piece of data at the two times of data reception.

In one embodiment, after the terminal device sends the data on the bundled time-frequency resources, the method further includes:

the terminal device receives, on the first type of carrier, first feedback information sent by the network device, where the first feedback information is used to indicate that the data information on the first type of carrier and the second type of carrier fails to be sent; or the terminal device receives, on the first type of carrier, second feedback information sent by the network device, where the second feedback information is used to indicate that at least one piece of the data information on the first type of carrier and the second type of carrier is successfully sent.

For example, if a carrier 0 is the first type of carrier, and a carrier 1 is the second type of carrier, the terminal device sends data information on the carrier 0 and the carrier 1, and the network device receives bundled data information on the carrier 0 and the carrier 1 separately. If the network device performs incorrect decoding in both the carrier 0 and the carrier 1, the network device feeds back a NACK on a time-frequency resource on the carrier 0 to the terminal device, indicating that the two times of data reception by the network device both fail; or if the network device performs correct decoding in at least one of the carrier 0 and the carrier 1, the network device returns an ACK on a time-frequency resource on the carrier 0 to the terminal device, indicating that the terminal device successfully receives at least one piece of data at the two times of data reception.

Figure 5:
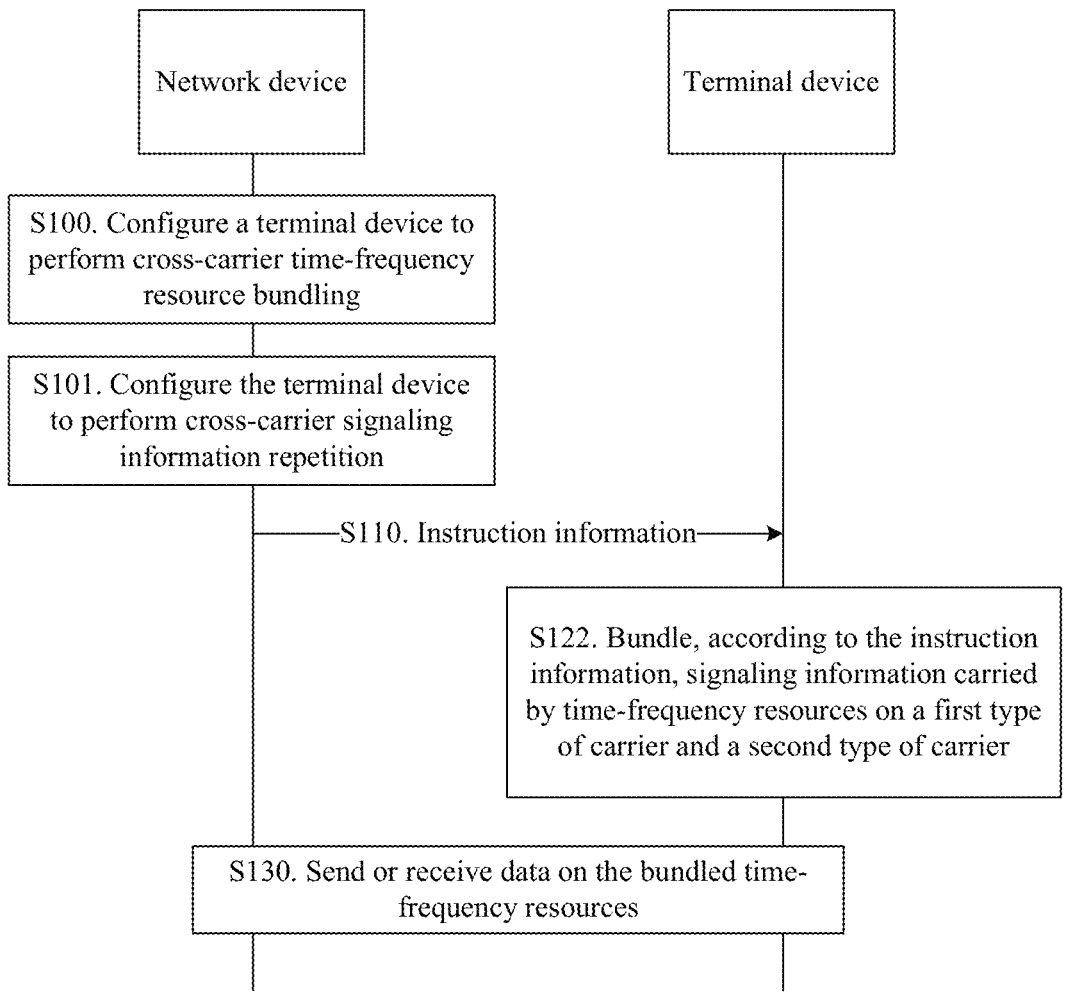
FIG. 5 is still another schematic flowchart of a method for transmitting data on multiple carriers according to an embodiment of the disclosure.

FIG. 5 is still another schematic flowchart of a method for transmitting data on multiple carriers according to an embodiment of the disclosure.

In one embodiment, as shown in FIG. 5, before operation S110, operation S101 may be further performed first.

Operation S101. The network device configures the terminal device to perform cross-carrier signaling information repetition.

In one embodiment, the time-frequency resources carry signaling information. As shown in FIG. 5, the instruction information in S110 is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

In one embodiment, as shown in FIG. 5, S120 in which the terminal device bundles the time-frequency resources on the first type of carrier and the second type of carrier according to the instruction information may be further implemented by the following operation.

Operation S122. The terminal device bundles, according to the instruction information, signaling information carried by the time-frequency resources on the first type of carrier and the second type of carrier.

Specifically, by using higher layer signaling, the network device configures the terminal device to perform cross-carrier time-frequency resource bundling and cross-carrier signaling information repetition; the network device configures one carrier as the first type of carrier and one or more carriers except the first type of carrier as the second type of carrier by using higher layer signaling; the terminal device receives multiple pieces of signaling information on the time-frequency resources on the first type of carrier and the second type of carrier as a receive end, where the multiple pieces of signaling information are all signaling information for the first type of carrier; and the terminal device bundles the signaling information carried by the time-frequency resources on the first type of carrier and the second type of carrier, and sends or receives data on the bundled time-frequency resources.

For example, if a carrier 0 is the first type of carrier, and a carrier 1 is the second type of carrier, the network device sends, on the carrier 0 and the carrier 1, signaling information of the carrier 0. The terminal device receives the signaling information on the carrier 0 and the carrier 1. The terminal device bundles the signaling information carried by time-frequency resources on the carrier 0 and the carrier 1, to obtain scheduling information of the carrier 0, where the scheduling information indicates that data transmission is performed on a time-frequency resource on the carrier 0.

It should be understood that, when the terminal device sends signaling information on the first type of carrier and the second type of carrier as a transmit end, the network device receives bundled signaling information on the first type of carrier and the second type of carrier as a receive end, where the signaling information may be the foregoing feedback information NACK or ACK. The disclosure is not limited thereto.

In this embodiment of the disclosure, the terminal device bundles the signaling information carried by the time-frequency resources on the first type of carrier and the second type of carrier, thereby ensuring reliability of the signaling information.

The foregoing describes in detail the method for transmitting data on multiple carriers according to the embodiments of the disclosure with reference to FIG. 2 to FIG. 5. The following describes in detail a terminal device and a network device for transmitting data on multiple carriers according to the embodiments of the disclosure with reference to FIG. 6 to FIG. 9.

Figure 6:
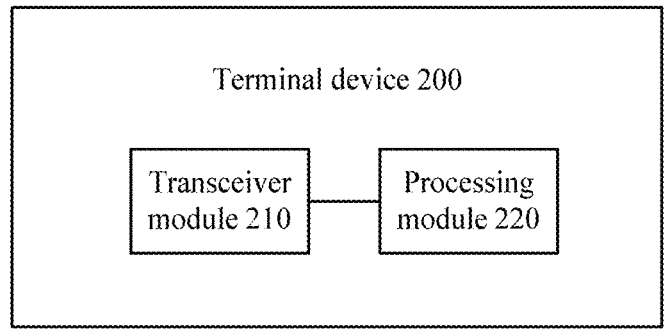
FIG. 6 is a schematic block diagram of a terminal device according to an embodiment of the disclosure.

FIG. 6 is a schematic block diagram of a terminal device 200 for transmitting data on multiple carriers according to an embodiment of the disclosure. As shown in FIG. 6, the terminal device 200 includes:

a transceiver module 210, configured to receive instruction information sent by a network device, where the instruction information is used to instruct the terminal device to perform cross-carrier time-frequency resource bundling; and a processing module 220, configured to bundle time-frequency resources on a first type of carrier and a second type of carrier according to the instruction information; where the transceiver module 210 is further configured to send or receive data on the bundled time-frequency resources.

In one embodiment, the time-frequency resources carry data information, and the transceiver module 210 is further configured to receive, on the first type of carrier and the second type of carrier separately, first control information sent by the network device, where a HARQ entity to which a HARQ process indicated by the first control information belongs is a HARQ entity of the first type of carrier.

In one embodiment, the time-frequency resources carry data information, and the transceiver module 210 is further configured to receive, on the first type of carrier, second control information sent by the network device, where the second control information is used to jointly schedule the first type of carrier and the second type of carrier.

In one embodiment, the second control information is further used to indicate a redundancy version RV of data information on a first carrier, and the first carrier is any carrier in the first type of carrier and the second type of carrier;

the processing module 220 is further configured to determine an RV of data information on a carrier other than the first carrier in the first carrier and the second carrier according to a first predetermined rule; and the processing module 220 is further configured to bundle, according to the instruction information, redundancy versions of data information carried by the time-frequency resources on the first type of carrier and the second type of carrier.

In one embodiment, the first predetermined rule includes:

the second control information indicates an RV of data information on the first type of carrier, and the terminal device determines an RV of data information on the second type of carrier based on a carrier index; or the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

In one embodiment, the transceiver module 210 is further configured to send first feedback information on the first type of carrier to the network device, where the first feedback information is used to indicate that the data information on the first type of carrier and the second type of carrier fails to be received; or send second feedback information on the first type of carrier to the network device, where the second feedback information is used to indicate that at least one piece of the data information on the first type of carrier and the second type of carrier is successfully received.

In one embodiment, the transceiver module 210 is further configured to receive, on the first type of carrier, first feedback information sent by the network device, where the first feedback information is used to indicate that the data information on the first type of carrier and the second type of carrier fails to be sent; or receive, on the first type of carrier, second feedback information sent by the network device, where the second feedback information is used to indicate that at least one piece of the data information on the first type of carrier and the second type of carrier is successfully sent.

In one embodiment, the time-frequency resources carry signaling information, the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

In one embodiment, the first type of carrier and the second type of carrier are configured by the network device, a quantity of the first type of carrier is 1, and a quantity of the second type of carrier is greater than or equal to 1.

Figure 7:
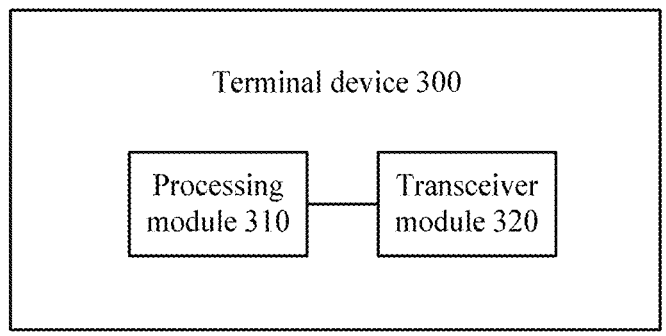
FIG. 7 is a schematic block diagram of a network device according to an embodiment of the disclosure.

FIG. 7 is a schematic block diagram of a network device 300 for transmitting data on multiple carriers according to an embodiment of the disclosure. As shown in FIG. 7, the network device 300 includes:

a processing module 310, configured to configure a terminal device to perform cross-carrier time-frequency resource bundling; and a transceiver module 320, configured to send instruction information to the terminal device, where the instruction information is used to instruct the terminal device to perform cross-carrier time-frequency resource bundling, and the cross-carrier time-frequency resource bundling operation is bundling, by the terminal device, time-frequency resources on a first type of carrier and a second type of carrier; where the transceiver module 320 is further configured to send or receive data on the bundled time-frequency resources.

In one embodiment, the time-frequency resources carry data information, and the transceiver module 320 is further configured to send first control information on the first type of carrier and the second type of carrier separately to the terminal device, where a HARQ entity to which a HARQ process indicated by the first control information belongs is a HARQ entity of the first type of carrier.

In one embodiment, the time-frequency resources carry data information, and the transceiver module 320 is further configured to send second control information on the first type of carrier, where the second control information is used to jointly schedule the first type of carrier and the second type of carrier.

In one embodiment, the second control information is further used to indicate a redundancy version RV of data information on a first carrier, and the first carrier is any carrier in the first type of carrier and the second type of carrier;

the processing module 310 is further configured to determine an RV of data information on a carrier other than the first carrier in the first carrier and the second carrier according to a second predetermined rule; and the processing module 310 is further configured to bundle, according to the instruction information, redundancy versions of data information carried by the time-frequency resources on the first type of carrier and the second type of carrier.

In one embodiment, the second predetermined rule includes:

the second control information indicates an RV of data information on the first type of carrier, and the network device determines an RV of data information on the second type of carrier based on a carrier index; or the second control information indicates an RV of data information on a second carrier, the second carrier is any carrier in the second type of carrier, and the network device determines an RV of data information on a carrier other than the second carrier in the first type of carrier and the second type of carrier based on a carrier index.

In one embodiment, the transceiver module 320 is further configured to receive, on the first type of carrier, first feedback information sent by the terminal device, where the first feedback information is used to indicate that the data information on the first type of carrier and the second type of carrier fails to be sent; or receive, on the first type of carrier, second feedback information sent by the terminal device, where the second feedback information is used to indicate that at least one piece of the data information on the first type of carrier and the second type of carrier is successfully sent.

In one embodiment, the transceiver module 320 is further configured to send first feedback information on the first type of carrier to the terminal device, where the first feedback information is used to indicate that the data information on the first type of carrier and the second type of carrier fails to be received; or send second feedback information on the first type of carrier to the terminal device, where the second feedback information is used to indicate that at least one piece of the data information on the first type of carrier and the second type of carrier is successfully received.

In one embodiment, the time-frequency resources carry signaling information, and the processing module 310 is further configured to configure the terminal device to perform cross-carrier signaling information repetition, where the instruction information is further used to instruct the terminal device to perform cross-carrier signaling information repetition, and the cross-carrier signaling information repetition is that the network device sends or receives, on the time-frequency resources on the first type of carrier and the second type of carrier, signaling information of the first type of carrier.

In one embodiment, the first type of carrier and the second type of carrier are configured by the network device, a quantity of the first type of carrier is 1, and a quantity of the second type of carrier is greater than or equal to 1.

Figure 8:
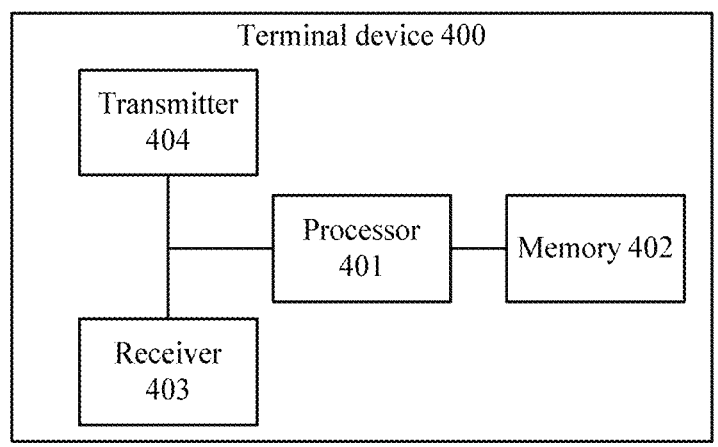
FIG. 8 is a schematic structural diagram of a terminal device according to an embodiment of the disclosure.

FIG. 8 is a schematic structural diagram of a terminal device 400 according to an embodiment of the disclosure. As shown in FIG. 8, the terminal device 400 includes a processor 401, a memory 402, a receiver 403, and a transmitter 404. The components are communicatively connected to each other. The memory 402 is configured to store an instruction. The processor 401 is configured to execute the instruction stored in the memory 402, control the receiver 403 to receive information, and control the transmitter 404 to send information.

The processor 401 is configured to execute the instruction stored in the memory 402, to perform an operation in a corresponding method in an embodiment of the disclosure.

Figure 9:
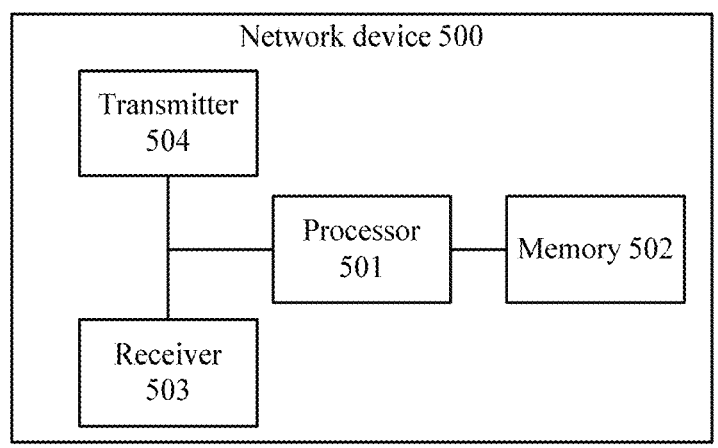
FIG. 9 is a schematic structural diagram of a network device according to an embodiment of the disclosure.

FIG. 9 is a schematic structural diagram of a network device 500 according to an embodiment of the disclosure. As shown in FIG. 9, the terminal device 500 includes a processor 501, a memory 502, a receiver 503, and a transmitter 504. The components are communicatively connected to each other. The memory 502 is configured to store an instruction. The processor 501 is configured to execute the instruction stored in the memory 502, control the receiver 503 to receive information, and control the transmitter 504 to send information.

The processor 501 is configured to execute the instruction stored in the memory 502, to perform an operation in a corresponding method in an embodiment of the disclosure.

The processor in this embodiment of the disclosure may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache.

An embodiment of the disclosure provides a computer-readable medium configured to store a computer program, where the computer program is used to perform the communication methods in the foregoing embodiments of the disclosure in FIG. 2 to FIG. 5. The readable storage may a ROM or a RAM. This is not limited in this embodiment of the disclosure.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of the disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A method for transmitting data on multiple carriers, comprising:
   receiving, by a terminal device, instruction information sent by a network device, wherein the instruction information is used to instruct the terminal device to perform cross-carrier time-frequency resource bundling;
   bundling, by the terminal device, time-frequency resources carrying data information on a first type of carrier and a second type of carrier according to the instruction information by bundling, by the terminal device according to the instruction information, redundancy versions of the data information carried by the time-frequency resources on the first type of carrier and the second type of carrier;
   sending or receiving, by the terminal device, data on the bundled time-frequency resources;
   receiving, by the terminal device on the first type of carrier, second control information sent by the network device, wherein the second control information is used to jointly schedule the first type of carrier and the second type of carrier and to indicate a redundancy version (RV) of data information on a first carrier, the first carrier is any carrier in the first type of carrier and the second type of carrier; and
   determining, by the terminal device, an RV of data information on a carrier other than the first carrier in the first carrier and the second carrier according to a first predetermined rule.

2. The method according to claim 1, further comprising:
   receiving, by the terminal device on the first type of carrier and the second type of carrier separately, first control information sent by the network device, wherein a hybrid automatic repeat request (HARQ) entity to which a HARQ process indicated by the first control information belongs is a HARQ entity of the first type of carrier.

3. The method according to claim 1, wherein the first predetermined rule comprises:
   the second control information indicates an RV of data information on the first type of carrier, and the terminal device determines an RV of data information on the second type of carrier based on a carrier index; or
   the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

4. The method according to claim 2, further comprising:
   after the terminal device receives the data information on the bundled time-frequency resources,
   sending, by the terminal device, first feedback information on the first type of carrier to the network device, wherein the first feedback information is used to indicate that the data information on the first type of carrier and the second type of carrier fails to be received; or
   sending, by the terminal device, second feedback information on the first type of carrier to the network device, wherein the second feedback information is used to indicate that at least one piece of the data information on the first type of carrier and the second type of carrier is successfully received.

5. The method according to claim 2, further comprising:
   after the terminal device sends the data information on the bundled time-frequency resources,
   receiving, by the terminal device on the first type of carrier, first feedback information sent by the network device, wherein the first feedback information is used to indicate that the data information on the first type of carrier and the second type of carrier fails to be sent; or
   receiving, by the terminal device on the first type of carrier, second feedback information sent by the network device, wherein the second feedback information is used to indicate that at least one piece of the data information on the first type of carrier and the second type of carrier is successfully sent.

6. A terminal device, comprising:
   a processor coupled to a memory to store instructions, which when executed by the processor, cause the processor to perform operations, the operations comprising:
   receiving instruction information sent by a network device, wherein the instruction information is used to instruct the terminal device to perform cross-carrier time-frequency resource bundling;
   bundling time-frequency resources carrying data information on a first type of carrier and a second type of carrier according to the instruction information by bundling, according to the instruction information, redundancy versions of data information carried by the time-frequency resources on the first type of carrier and the second type of carrier;
   sending or receiving data on the bundled time-frequency resources;
   receiving, on the first type of carrier, second control information sent by the network device, wherein the second control information is used to jointly schedule the first type of carrier and the second type of carrier and to indicate a redundancy version (RV) of data information on a first carrier, the first carrier is any carrier in the first type of carrier and the second type of carrier; and
   determining an RV of data information on a carrier other than the first carrier in the first carrier and the second carrier according to a first predetermined rule.

7. The terminal device according to claim 6, wherein the operations further comprise: receiving, on the first type of carrier and the second type of carrier separately, first control information sent by the network device, wherein a hybrid automatic repeat request (HARQ) entity to which a HARQ process indicated by the first control information belongs is a HARQ entity of the first type of carrier.

8. The terminal device according to claim 6, wherein the first predetermined rule comprises:
   the second control information indicates an RV of data information on the first type of carrier, and the terminal device determines an RV of data information on the second type of carrier based on a carrier index; or the second control information indicates an RV of data information on a second carrier, the second carrier is any carrier in the second type of carrier, and the terminal device determines an RV of data information on a carrier other than the second carrier in the first type of carrier and the second type of carrier based on a carrier index.

9. The terminal device according to claim 7, wherein the operations further comprise:
sending first feedback information on the first type of carrier to the network device, wherein the first feedback information is used to indicate that the data information on the first type of carrier and the second type of carrier fails to be received; or
sending second feedback information on the first type of carrier to the network device, wherein the second feedback information is used to indicate that at least one piece of the data information on the first type of carrier and the second type of carrier is successfully received.

10. A network device, comprising:
a processor coupled to a memory to store instructions, which when executed by the processor, cause the processor to perform operations, the operations comprising:
configuring a terminal device to perform cross-carrier time-frequency resource bundling;
sending instruction information to the terminal device, wherein the instruction information is used to instruct the terminal device to perform cross-carrier time-frequency resource bundling, and the cross-carrier time-frequency resource bundling operation is bundling, by the terminal device, time-frequency resources carrying data information on a first type of carrier and a second type of carrier;
sending or receiving data on the bundled time-frequency resources;
sending second control information on the first type of carrier, wherein the second control information is used to jointly schedule the first type of carrier and the second type of carrier and to indicate a redundancy version (RV) of data information on a first carrier, and the first carrier is any carrier in the first type of carrier and the second type of carrier; and
determining an RV of data information on a carrier other than the first carrier in the first carrier and the second carrier according to a second predetermined rule;
wherein bundling the time-frequency resources carrying the data information on the first type of carrier and the second type of carrier comprises bundling, according to the instruction information, redundancy versions of data information carried by the time-frequency resources on the first type of carrier and the second type of carrier.

11. The network device according to claim 10, wherein the time-frequency resources carry data information, and the transceiver module is further configured to send first control information on the first type of carrier and the second type of carrier separately to the terminal device, wherein a hybrid automatic repeat request (HARQ) entity to which a HARQ process indicated by the first control information belongs is a HARQ entity of the first type of carrier.

12. The network device according to claim 10, wherein the second predetermined rule comprises:
the second control information indicates an RV of data information on the first type of carrier, and the network device determines an RV of data information on the second type of carrier based on a carrier index; or
the second control information indicates an RV of data information on a second carrier, the second carrier is any carrier in the second type of carrier, and the network device determines an RV of data information on a carrier other than the second carrier in the first type of carrier and the second type of carrier based on a carrier index.

13. The network device according to claim 11, wherein the operations further comprise:
receiving, on the first type of carrier, first feedback information sent by the terminal device, wherein the first feedback information is used to indicate that the data information on the first type of carrier and the second type of carrier fails to be sent; or
receiving, on the first type of carrier, second feedback information sent by the terminal device, wherein the second feedback information is used to indicate that at least one piece of the data information on the first type of carrier and the second type of carrier is successfully sent.

14. The network device according to claim 11, wherein the operations further comprise:
sending first feedback information on the first type of carrier to the terminal device, wherein the first feedback information is used to indicate that the data information on the first type of carrier and the second type of carrier fails to be received; or
sending second feedback information on the first type of carrier to the terminal device, wherein the second feedback information is used to indicate that at least one piece of the data information on the first type of carrier and the second type of carrier is successfully received.

* * * * *